United States Patent
Rost et al.

(10) Patent No.: US 11,956,157 B2
(45) Date of Patent: Apr. 9, 2024

(54) ACTIVATION OF PDU SESSION AND QOS FLOWS IN 3GPP-BASED ETHERNET BRIDGES

(71) Applicant: Nokia Solutions and Networks Oy, Espoo (FI)

(72) Inventors: Peter Rost, Heidelberg (DE); Borislava Gajic, Unterhaching (DE); Rakash SivaSiva Ganesan, Unterhaching (DE); Christian Mannweiler, Munich (DE); Devaki Chandramouli, Plano, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/614,866

(22) PCT Filed: May 30, 2019

(86) PCT No.: PCT/EP2019/064142
§ 371 (c)(1),
(2) Date: Nov. 29, 2021

(87) PCT Pub. No.: WO2020/239231
PCT Pub. Date: Dec. 3, 2020

(65) Prior Publication Data
US 2022/0224651 A1 Jul. 14, 2022

(51) Int. Cl.
*H04L 47/28* (2022.01)
*H04L 45/745* (2022.01)
*H04L 47/2491* (2022.01)

(52) U.S. Cl.
CPC ........ *H04L 47/2491* (2013.01); *H04L 45/745* (2013.01); *H04L 47/28* (2013.01)

(58) Field of Classification Search
CPC .... H04L 45/745; H04L 47/2491; H04L 47/28
See application file for complete search history.

(56) References Cited

U.S. PATENT DOCUMENTS

2018/0006955 A1   1/2018   Bush et al.
2018/0063020 A1   3/2018   Bhagavatula et al.
(Continued)

OTHER PUBLICATIONS

"TSC Architecture", SA WG2 Meeting #130, S2-1902060, Nokia, Jan. 21-25, 2019, pp. 1-4.
(Continued)

*Primary Examiner* — Phuc H Tran
(74) *Attorney, Agent, or Firm* — Mintz Levin Cohn Ferris Glovsky and Popeo, P.C.

(57) ABSTRACT

Methods and apparatus, including computer program products, are provided for a 3GPP bridge for time sensitive networks. In some example embodiment, there may be provided an apparatus causes to at least: receive at least one management object, the at least one management object comprising routing information between an ingress port at a 3GPP bridge and an egress port at the 3 GPP bridge; determine, for the ingress port and the egress port combination, at least one quality of service constraint to provide a delay guarantee towards a destination media access control address, the determination based on the received at least one management object and one or more bridge delays indicating a delay between the ingress port and the egress port; and cause a change, based on the determined at least one quality of service constraint, to a protocol data unit session carrying a time sensitive network flow.

14 Claims, 7 Drawing Sheets

(56) References Cited

U.S. PATENT DOCUMENTS

| | | | |
|---|---|---|---|
| 2018/0160424 A1 | 6/2018 | Cavalcanti et al. | |
| 2021/0219357 A1* | 7/2021 | Talebi Fard | H04L 47/724 |
| 2022/0021624 A1* | 1/2022 | Sachs | H04L 47/28 |
| 2022/0078662 A1* | 3/2022 | Wang | H04L 47/20 |

OTHER PUBLICATIONS

Decker et al., "Definitions of Managed Objects for Bridges", RFC 1493, Network Working Group, Jul. 1993, pp. 1-34.
Levi et al., "Definitions of Managed Objects for Bridges with Traffic Classes, Multicast Filtering, and Virtual LAN Extensions", RFC 4363, Network Working Group, Jan. 2006, pp. 1-99.
"3rd Generation Partnership Project; Technical Specification Group Services and System Aspects; Study on enhancement of 5G System (5GS) for vertical and Local Area Network (LAN) services (Release 16)", 3GPP TR 23.734, V16.1.0, Mar. 2019, pp. 1-111.
"IEEE Standard for Local and Metropolitan Area Networks, Bridges and Bridged Networks", IEEE Computer Society, IEEE Std 802.1Q™—2018, 2018, 1993 pages.
"Support for IEEE 802.1Qbv scheduling", 3GPP TSG-SA WG2 Meeting #132, S2-1903378, Agenda: 6.15.2, Ericsson, Apr. 8-12, 2019, pp. 1-6.
Ditzel et al., "Time Sensitive Network (TSN) Protocols and Use in Ethernet/IP Systems", ODVA Industry Conference & 17th Annual Meeting, Oct. 13-15, 2015, pp. 1-24.
"Granularity of TSN bridge", 3GPP TSG-SA WG2 Meeting #132, S2-1903366, Ericsson, Apr. 8-12, 2019, 3 pages.
Singh, "Routing Algorithms for Time Sensitive Networks", Master Thesis, 2017, 89 pages.
"3rd Generation Partnership Project; Technical Specification Group Services and System Aspects; Procedures for the 5G System; Stage 2 (Release 16)", 3GPP TS 23.502, V16.0.2, Apr. 2019, pp. 1-419.
"Granularity of TSN bridge", 3GPP TSG-SA WG2 Meeting #132, S2-1904721, Ericsson, Apr. 8-12, 2019, 3 pages.
"3rd Generation Partnership Project; Technical Specification Group Services and System Aspects; System Architecture for the 5G System; Stage 2 (Release 16)", 3GPP TS 23.501, V16.0.2, Apr. 2019, pp. 1-317.
"Clarifications on URLLC support", 3GPP TSG-SA WG2 Meeting #132, S2-1904651, Huawei, Apr. 8-12, 2019, pp. 1-5.
"Conclusion proposal for Key Issue #4", 3GPP TSG-SA WG2 Meeting #132, S2-1904684, Huawei, Apr. 8-12, 2019, 4 pages.
"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.1.0, Mar. 2019, pp. 1-91.
International Search Report and Written Opinion received for corresponding Patent Cooperation Treaty Application No. PCT/EP2019/064142, dated Jan. 29, 2020, 11 pages.
"TSN-5GS QoS mapping", 3GPP TSG-SA WG2 Meeting #132, S2-1903376, Agenda: 6.15.2, Ericsson, Apr. 8-12, 2019, 7 pages.
Mannweiler et al., "Reliable and Deterministic Mobile Communications for Industry 4.0: Key Challenges and Solutions for the Integration of the 3GPP 5G System with IEEE Time-Sensitive Networking", Mobile Communication—Technologies and Applications; 24. ITG-Symposium, May 15-16, 2019, pp. 64-69.

* cited by examiner

ACTIVATION OF PDU SESSION AND QOS FLOWS IN 3GPP-BASED ETHERNET BRIDGES

RELATED APPLICATION

This application claims priority to PCT Application No. PCT/EP2019/064142, filed on May 30, 2019, the contents for which is incorporated herein by reference in its entirety.

FIELD

The subject matter described herein relates to time sensitive networking.

BACKGROUND

Time sensitive networks (TSN) may be used to support a variety of applications including applications such as ultra-reliable low-latency communications (URLLC), industrial verticals, and/or the like. In the case of industrial verticals and other mission critical applications, there may be some requirements that are relatively unique, such as certain requirements for low latency, deterministic data transmission, and high reliability, when compared to other 5G cellular services.

SUMMARY

In some example embodiment, there may be provided an apparatus configured to at least: receive at least one management object, the at least one management object comprising routing information between an ingress port at a 3GPP bridge and an egress port at the 3GPP bridge; determine, for the ingress port and the egress port combination, at least one quality of service constraint to provide a delay guarantee towards a destination media access control address, the determination based on the received at least one management object and one or more bridge delays indicating a delay between the ingress port and the egress port; and cause a change, based on the determined at least one quality of service constraint, to a protocol data unit session carrying a time sensitive network flow.

In some variations, one or more of the features disclosed herein including the following features can optionally be included in any feasible combination. The delay guarantee may represent a constraint on a quality of service for the time sensitive network flow. The delay guarantee may represent a minimum bridge delay and a maximum bridge delay through the 3GPP bridge. The at least one management object may include a forwarding table indicating actual traffic for the ingress port and the egress port. The at least one management object may be provided by a centralized network controller of a time sensitive network. The at least one management object may include a static multicast table and/or a static unicast table. The at least one management object may be provided in a distributed manner via a stream reservation protocol of the time sensitive network. The at least one management object may include queue information and/or schedule information in accordance with IEEE 802.1Qbv. The one or more bridge delays may be reported by the 3GPP bridge to a centralized network controller of the time sensitive network. The determined at least one quality of service constraint may be forwarded to a session management function to cause the change, based on the determined at least one quality of service constraint, to the protocol data unit session carrying the time sensitive network flow. The change to the protocol data unit session includes a modification of one or more existing flows within the protocol data unit session, an establishment of one or more new flows within the protocol data unit session, and/or a release of an existing flow within the protocol data unit session. The protocol data unit session may be released when the routing information in the received at least one management object does not include entries for an ingress port or an egress port associate with the protocol data unit session. The routing information may further define whether traffic transmission related to a certain traffic class on the ingress port or the egress port is allowed, and/or wherein the apparatus is further configured to at least release the protocol data unit session when the protocol data unit session is associated with the certain traffic class and traffic transmission related to a certain traffic Class on the ingress port or the egress port is not allowed. The protocol data unit session may be established to provide an initial service guarantee to the centralized network controller before the at least one management object is received from a centralized network controller of the time sensitive network. The apparatus may be comprised in or comprises an application function and/or a policy control function.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
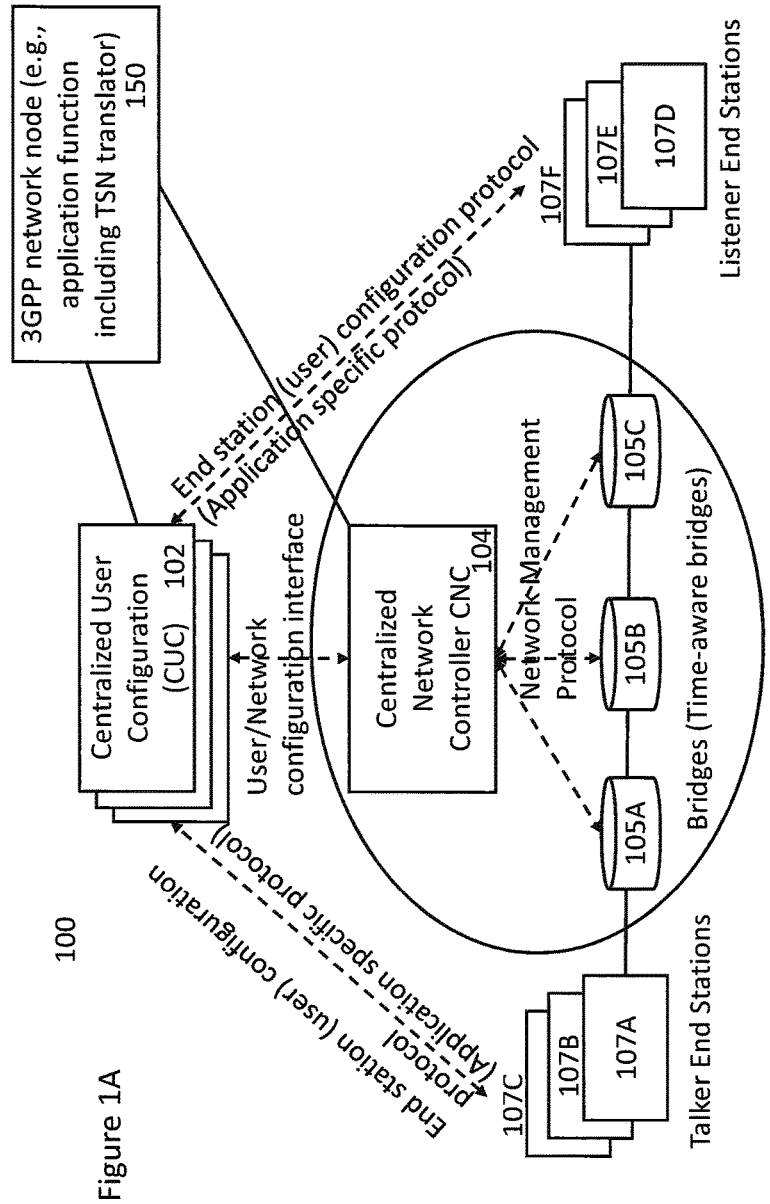
FIG. 1A depicts an example of a portion of a time sensitive network, in accordance with some example embodiments.

Like labels are used to refer to same or similar items in the drawings.

DETAILED DESCRIPTION

In some systems such as tactile industrial networks including industrial IoT (IIoT) or Industry 4.0 networks, 3GPP wireless technologies may be applied in addition to wired time sensitive networking (TSN) in industrial environments to provide additional flexibility with respect to mobility and to provide scalability with respect to the quantity of sensors, actuators, and/or the like which can be supported.

A bridge model option for the integration of 3GPP and TSN may be used as a baseline (see, e.g., 3GPP, TR 23.734, "Study on 5GS Enhanced support of Vertical and LAN Services"). In the bridge model option, the 5G system may incorporate one or more TSN translator (TT) functions at the 5G network side and the user equipment (UE) side to enable the 5G system (or one or more nodes therein) to provide a TSN bridge for TSN communications between TSN end stations, such as user equipment (UE) including circuitry for TSN including the TTs. The TSN translators may include a set of functionalities to enable the 5G system to provide TSN services. For example, the TT functions may be supported by a proprietary implementation of the TSN translators or by the 5G system natively. Examples of the TT functionalities may include forwarding and queuing of TSN frames with respect to schedules (which includes additional TSN bridge functions as defined in IEEE 802.1Qcc and/or the like), frame replication and elimination for reliability, support for non-TSN-aware end stations, and/or other functions such as those described in S2-1902060, CR request for 23.501, February 2019.

FIG. 1A depicts an example of a TSN network 100 configured in a fully centralized configuration model, although other configuration models may be implemented as well. In the TSN network example of FIG. 1A, the network may include a centralized user configuration (CUC) function 102, a centralized network controller (CNC) 104 function, one or more TSN bridges 105A-C, and one or more end stations 107A-D.

The CUC 102 may be configured in accordance with the one or more of the IEEE 802.1 series of TSN standards. The CUC may control the configuration of end stations 107A-F and/or applications at the end stations. For example, the CUC may interface with the CNC 104 to make requests to the CNC for deterministic, TSN communications (e.g., TSN flows) with specific requirements for those flows between end stations. The TSN flow may represent a time sensitive, deterministic stream of traffic between end stations. These TSN flows may have low delay and/or strict timing requirements for time sensitive networks. For example, a TSN flow between end stations may be used in an industrial control application (e.g., robot, etc.) requiring low delay and/or strict, deterministic timing between the end stations.

The CNC 104 may provide a proxy for the TSN bridges 105A-C and the corresponding interconnections, and as a proxy for control applications that require deterministic communication. The CNC may define the schedules on which all TSN traffic is transmitted between the end stations including any intervening devices such as the TSN bridges 105A-C.

The TSN bridges 105A-C may be implemented as Ethernet switches, for example. The TSN bridges are configured to transmit and/or receive TSN flows. The TSN flow may be in the form of Ethernet frames transmitted and/or received on a schedule to meet the low delay and/or deterministic requirements of the TSN flow. For example, the talker end station 107A may transmit traffic based on a schedule (see, e.g., IEEE 802.1Qbv) to a bridge 105A, which may also receive and/or transmit traffic to another device based on a schedule.

The end stations 107A-F may be a source and/or a destination of a TSN flow. The end stations may include an application, such as an industrial application or other application requiring low delay and/or other time sensitive requirement for a deterministic traffic flow. The end stations may also be referred to as talkers and listeners. Talker end stations 107A-C refer to an end station which at a given instance is "talking," such as transmitting in accordance with TSN, while the listener end stations 107D-F refer to an end station which at a given instance is "listening." For example, each of the end stations may include circuitry to transmit (e.g., in the case of a "talker") and/or receive (e.g., in the case of a "listener") using for example, Time Sensitive Network (TSN) circuitry that enables communications over a TSN network in accordance with the IEEE suite of 802.1 series of standards.

Figure 1B:
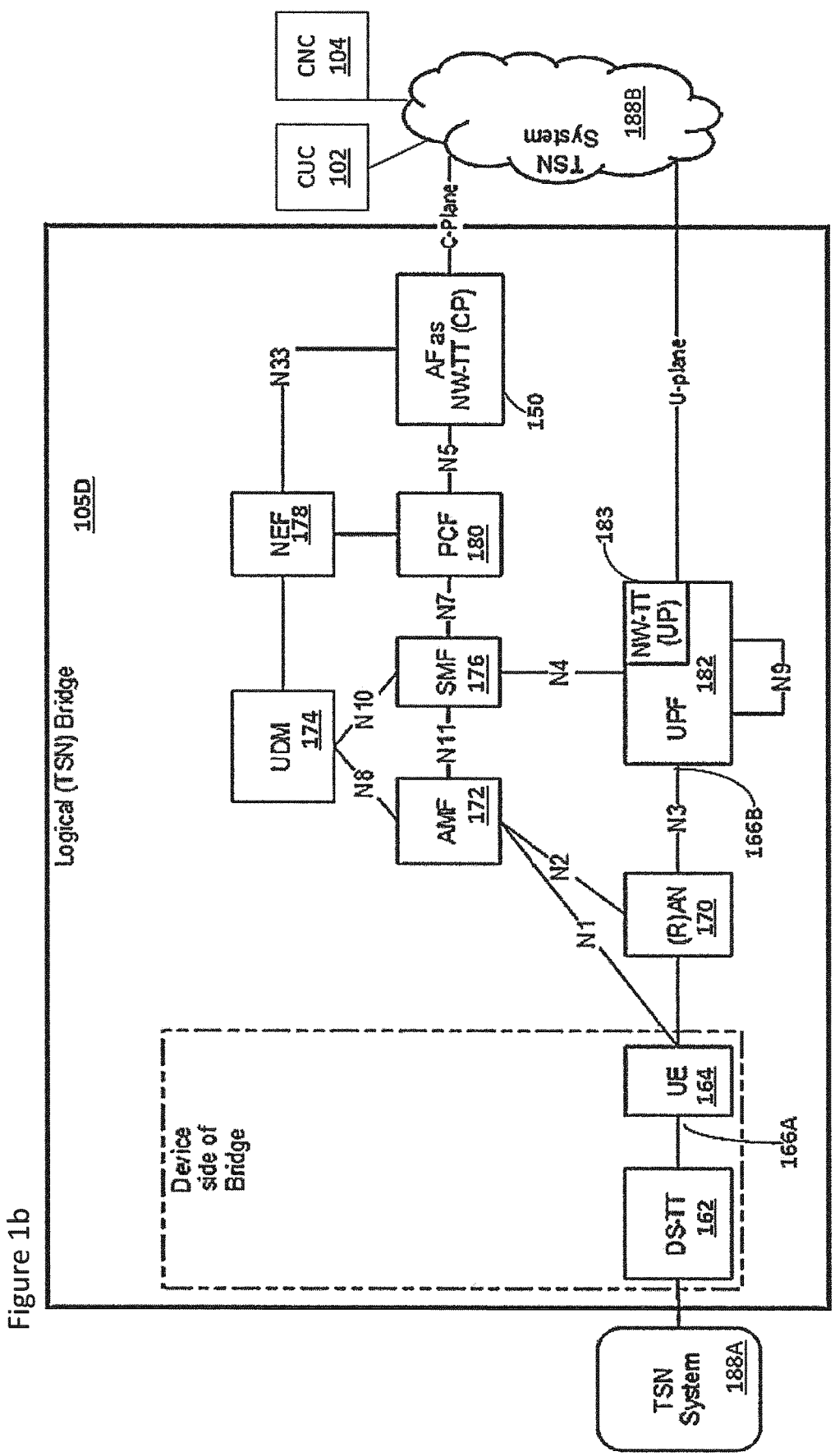
FIG. 1B depicts an example of a 3GPP bridge for a time sensitive network, in accordance with some example embodiments.

FIG. 1B depicts an example of a TSN bridge 105D, in accordance with some example embodiments. The TSN bridge 105D is also referred to herein as a 3GPP bridge 105D as the 3GPP bridge 105D is implemented as part of the cellular wireless system, such as the 5G system.

In the example of FIG. 1B, the TSN system 188A may comprise the end station 107A, which may access the 3GPP bridge 105D via for example a wired connection to a user equipment (UE) 164 and a device side (DS) TT 162. The user equipment 164 may establish a connection with a user plane function 182 (which also includes a network side (NW) TT) via a radio access network (RAN) 170, such as a 5G gNB or other type of base station. The UPF 182 including the NW TT 182 may provide a TSN compatible user plane data flow to TSN system 188B, which may comprise the end station 107D for example. Thus, this connection via the RAN represents the wireless part of the end-to-end connection between the TSN system 188A and TSN system 188B.

The DS TT 162 and NW-TT 183 may translate TSN user plane data between the TSN system and the 3GPP System (e.g., via an ingress port 166A at the UE and an egress port 166B at the UPF 182. Although FIG. 1B depicts the NW TT 183 at the UPF 182, the NW TT may be located at other nodes as well.

FIG. 1B also depicts other network elements including an Access and Mobility Management Function (AMF) 172, a User Data Management (UDM) function 174, a Session Management Function (SMF) 176, a Policy Control Function (PCF) 180, a Network Exposure Function (NEF) 178, and an Application Function (AF) 150. In the example of FIG. 1B, the AF 150 also includes a NW TT as part of the control plane.

In some example embodiments, one or more nodes of the 3GPP bridge 105D may interface with the CUC 102 and/or CNC 104 to obtain information regarding the end station requirements for the TSN flow connection(s). For example, the AF 150 may interface to the TSN's CUC 102 and/or CNC 104 to obtain information regarding the TSN flows between TSN systems 188A-B (e.g., end stations). The 3GPP bridge 105D may include one or more radio access networks 170 (e.g., a radio access network served by a base station, gNB, eNB, and/or other nodes including core network nodes) to enable wireless connectivity for an end-to-end TSN flow between the TSN systems. Referring again to FIG. 1A, one or more of the bridges 105A-C may be implemented using the 3GPP bridge 105D of FIG. 1D to provide TSN support over the 5G wireless system. From the perspective of the end stations 107A and D for example, the 5G system's 3GPP bridge 105D appears like a more traditional wired TSN bridge.

The establishment of end-to-end (E2E) communications between TSN systems 188A-B may include phases, such as a pre-configuration and authentication phase, a network discovery phase, a stream requirements and schedule computation phase, and a configuration of the bridges and the end stations phase.

During the pre-configuration phase, the end stations may be configured with the TSN flow's (also referred to as a stream or a TSN stream) QoS requirements. The QoS requirements for an end station's application may be pre-defined or known. For example, a temperature sensor application at end station 107A may have a known QoS requirement for communication with an end station listener 107D. In this example, the talker end station may transmit streams at regular intervals (e.g., a cyclic communication), although the transmission may occur at other times as well (e.g., based on event triggering, such as in the case of a temperature sensor whenever a temperature rises above a certain threshold). The TSN bridges may also be pre-configured with parameters such as bridge delay objects. For example, the TSN bridges may be configured with bridge delays, which may be port-pair and traffic-class specific. Moreover, TSN may support up to 8 traffic classes, to which 8 priority classes are mapped. Each priority class may have a traffic class defined. Therefore, a TSN bridge's ingress port and egress port mapping may have 8 traffic classes resulting in 8 delay-value tuples. Each delay-value tuple may include a maximum delay and minimum delay, which may be divided into packet length dependent and independent parts. For example, each tuple (e.g., TSN bridge ingress port-TSN bridge egress port and corresponding TSN traffic class). The bridge's delay may be captured in a managed object including: frame-length-independent delay (minimum); frame-length-independent delay (maximum); a frame-length-dependent delay (minimum); and/or a frame-length-dependent delay (maximum).

During network discovery phases, the TSN bridges and the end stations may utilize a link layer discovery protocol (LLDP) to exchange the port MAC address and link propagation delay with adjacent network elements, such as other TSN bridges, the CNC 104, and/or the like. The LLDP protocol may be used periodically and/or may be triggered by a change in one of the LLDP parameters. The CNC 104 may crawl through the network and read the TSN bridge's managed objects, such as bridge delay objects, propagation delay objects, and port MAC address table. From this, the CNC may build a view of the network topology. The CNC may also know the bridge and link capacities in the network. To collect this information, the CNC may use simple network protocol (SNMP) and message information bases such as those defined in IEEE 802.1Q as well as other techniques (e.g., the NETCONF protocol or RESTCONF protocols together with YANG data models).

During the stream requirements phase and schedule computation phase, the CUC 102 may read the TSN flow requirements from the end stations using an application-specific protocol. The CUC may translate these requirements into corresponding TSN stream requests that are understandable by the CNC 104. The CNC (which has the knowledge of the complete network) may compute the schedules including computing the paths for each end-to-end communication flow between end stations (via the TSN bridges 105A-D), priorities for the TSN streams, the time window a talker is expected to transmit and a listener is expected to receive frames, and the configuration of the TSN bridges including port forwarding and gating control. Depending on whether requests can be satisfied or not, the corresponding response may be given to the CUCs.

During the bridge and end station configuration phase, CUC 102 may trigger the CNC 104 to configure the TSN bridges with the parameters for establishment of the end-to-end connection (which may include the schedules for the connections) for the TSN stream between end stations (via the TSN bridges). The CNC may perform a network check if something has changed in the network, and may then configure the TSN bridge managed objects. After configuring the TSN bridges, the CNC may provide the CUC with the configuration parameters for the talker and the listener end stations. The CUC may, as noted, configure the end stations as well as the applications at the end stations (which may include the schedules for transmission and reception over the connection for the TSN flow). At this point, the network 100 is ready for TSN communications between end stations.

To provide the 3GPP bridge 105D for TSN in accordance with some example embodiments, the 5G system (or one or more nodes therein) may expose towards TSN entities (e.g., the CUC 102, CNC 104, and/or TSN end stations 107A-F) the same or similar set of parameters as a standard, wired IEEE 802.1, TSN bridge. In this way, the 5G system's 3GPP bridge 105D may resemble the behavior of a more traditional wired IEEE 802.1, wired TSN bridge, such as bridges 105A-C. Referring again to FIG. 1B, the bridge delay would represent the delay between port pairs 166A-B. As TSN is low delay and deterministic, the 5G system may provide certain delay guarantees to provide the QoS needed to achieve these delay guarantees for a TSN flow.

Referring again to the CNC 104, it may use a set of managed objects in order to acquire the information about the TSN bridges, build the knowledge about the network capabilities, and configure each TSN bridge. As noted, one or more of these TSN bridges 105A-C may be wirelessly provided by the 5G system in the form of a 3GPP bridge 105D to provide wireless connectivity between a pair of end stations, such as end station 107A and 107D (each of which may comprise, as noted, a UE including a TT).

The managed objects may include information, such as bridge delay, propagation delay, static trees, and/or Multiple Registration Protocol extended control (see, e.g., IEEE 802.1Q-2018, IEEE Standard for Local and Metropolitan Area Networks, Bridges and Bridged Networks). The bridge delay may be of importance for operations of the integrated TSN-3GPP network. The attributes of a bridge delay managed object may determine the delay of frames, which pass through the 3GPP bridge itself. In the so-called "TSN fully centralized configuration model" for example, the TSN's CNC 104 may expect that the bridge delay be expressed through the values that are dependent and independent of the frame length. For each possible connection between two ports of a bridge and a traffic class, a corresponding minimum and maximum packet size independent and packet size dependent delay parameters need to be provided (e.g., four values per port pair and traffic class). Assuming for example that N user equipment (UEs) and 1 user plane function (UPF) would be involved in a 3GPP bridge provided by the 3GPP/5G system, the UEs and UPF may each have one port, with each port supporting a maximum 8 traffic classes. In this example, the 3GPP bridge may need to report $(N+1)*N*8/2$ bridge delay managed objects, each of which may consist of min/max independent and min/max dependent delay values, at maximum. This may be divided in to two cases as shown in Table 1. In order to guarantee the delays, resources may be allocated for each of the reported delays.

TABLE 1

The delay for connecting a UE port to a UPF port is reported. The 3GPP bridge may report at maximum N such port combinations with a maximum of 8 traffic classes (e.g., N*8 bridge delay managed objects each consisting of the above mentioned min/max independent/dependent delays).
The delay for connecting two UE ports is reported. The 3GPP bridge may report at maximum N*(N − 1)*8/2 such bridge delay managed objects, i.e., the vast majority. Each delay would include the delay from UE to UPF, UPF processing delay, and delay from UPF to UE.

A challenge for a 3GPP bridge 105D is that the 3GPP bridge may have to report the above-mentioned bridging delays in the network discovery phase prior to setting up or transmitting any TSN flow streams. But these 3GPP bridge delays may need to be somewhat guaranteed to the CNC 104, and hence, these delays may be fulfilled in order to operate the TSN network even though the 3GPP bridge does not yet have information about the actual TSN traffic flow patterns and payload required by end station devices. The challenge may have an impact on the 3GPP bridge, which on the one hand may need to fulfil the delay guarantees the 3GPP bridge gave in the network discovery phase but on the other hand the 3GPP bridge may have to operate the bridge efficiently without wasting resources in the 3GPP/5G system unnecessarily.

In some example embodiments, there is provided resource utilization optimization using a 3GPP bridge for TSN networking between end stations (operating as a talker end station and a listening end station) by combining at least the forwarding tables provided by the CNC 104 and the 3GPP bridge delays in order to determine the QoS requirements for operating the 3GPP bridge according to the TSN flow schedule provided by the CNC.

In the course of the network configuration by the TSN Centralized Network Control (CNC) 104, the 3GPP bridge 105D may receive an indication of the presence of TSN frame traffic. As noted, this indication may be in the form of so-called "forwarding tables." Examples of the forwarding tables include the managed objects dot1qStaticMulticastTable and/or dot1qStaticUnicastTable, or some other type of indication of the actual, existence of TSN frame traffic between an ingress port and egress port pair. In the case of the forwarding tables in the form of a management object, the dot1qStaticMulticastTable includes one or more entries, such as a set of entries. Each entry includes the following information: a multicast destination address, a receive (or ingress) port, an egress port, a forbidden egress ports, a status of the entry. The receive port and the egress ports may be used to derive connectivity information. For example, the receive port and egress port information indicates what port pairs are actually being used for transmission of TSN traffic such as frames—enabling the 3GPP bridge to better allocate resources (e.g., by releasing, adding, and/or modifying a PDU session if needed). This information will be only known after the CNC provides the so-called forwarding tables to the 3GPP bridge.

In order for the 5G system to provide a 3GPP bridge 105D (which is representative of a TSN bridge), the 5G system including the 3GPP bridge may need to provide an initial promise or guarantee regarding the number of QoS flows being established and the associated QoS parameters for those QoS flows across the 5G system's 3GPP bridge 105D. For this purpose, the master information block (MIB) and the signaling procedures defined in TSN may be used in such a way that the QoS parameters for the QoS flows are setup so that it is not overprovisioned within the 5G system and without violating the delay guarantees provided by the 3GPP bridge. In order to identify the required minimum parameters on the QoS flows, the information at Table 2 may be utilized.

TABLE 2

The set of ports which are allowed to receive or transmit TSN frames.
The set of port pairs which are to be connected. This information may be pre-configured (e.g., from a planning tool or a 3GPP/TSN management layer).
The MIB objects that define the set of ports to which a specific or set of frame(s) arriving at a given port is allowed to be transmitted.
The schedule computed either centrally by an entity like CNC or schedule planned/computed locally through distributed protocols like Stream Reservation Protocol (SRP).
The topology of the network and/or the end-to-end stream requirements.

In some example embodiments, the minimum QoS requirements are imposed on one or more individual connections within the 3GPP bridge, such that the 3GPP bridge delays guaranteed by the 5G system and the gated schedule required by the CNC are both feasible. Table 3 includes some of the assumptions and requirements.

TABLE 3

The delay between a port at a UE ("UE port") n ∈ [1; N] and a port at a user plane function ("UPF port") N + 1 is defined by δ(n, N + 1) for each traffic class. The delay from UPF port N + 1 to the UE port n is defined by δ(N + 1, n) for each traffic class. The delay δ(n, 1) may be symmetric such that δ(n, 1) = δ(1, n), which is preferable because reported delay bridge managed objects (max/min independent/dependent delay) are symmetric.

TABLE 3-continued

The delay between UE ports n ∈ [1; N] and n' ∈ [1; N] with n ≠ n' is defined by δ(n, n') and would include the delay from UE port n to UPF and from UPF to UE port n' and the processing delay at the UPF(e.g., switching may be done internal to the 3GPP system at the UPF).

Each delay value is defined for a maximum data burst volume (MDBV), which may be the same for each delay value of a UE port in order to simplify the calculation. The MDBV derives from the packet-length dependent delay reported by a 3GPP bridge such that if Δ(n) is the reported packet dependent delay and the maximum throughput guaranteed by the 5G system may be ν, then the MDBV is given by MDBV = δ(n, n')/Δ(n).

For each delay value δ(k, 1), with k, 1 ∈ [1; N + 1], k ≠ 1, the QoS flow is setup within the 5GS such that the delay for the given MDBV can be guaranteed. This delay can be expressed through a QoS profile as part of PDB for the 5QI chosen for the QoS flow.

Each entry in dot1qStaticMulticastTable defines the tuple {Multicast MAC address α, receive port $n_R$, egress ports [$n_{α, 1}$, . . . $n_{α, M}$], forbidden egress ports, status}. In the case of dot1qStaticUnicastTable, the tuple {Unicast MAC address α, receive port $n_R$, egress ports [$n_{α, 1}$, . . . $n_{α, M}$], status} is defined. In the case of dot1qUnicastTable, the egress ports list the set of ports where a packet is forwarded if the destination address has not been learned. If the destination address has been learned (and a corresponding entry in dot1qTpFdbTable exists), the frame is only forward to the corresponding port).

---

In the course of the network configuration phase by the TSN's CNC 104, the 3GPP bridge 105D may receive the managed object, such as forwarding tables dot1qStaticMulticastTable and/or dot1qStaticUnicastTable as defined in for example IEEE 802.1Q. These forwarding tables may include routing information, such as the identification of a frame received at a given port of the 3GPP bridge with a given destination MAC address and queue information (which may further include schedule information in accordance with IEEE 802.1Qbv). The objects dot1qStaticMulticastTable and dot1qStaticUnicastTable may be of particular relevance because the TSN streams may be defined using multicast destination addresses or locally managed unicast addresses, so the CNC may set up at least one of these tables before a bridge is operational in order to make sure that unicast and multicast frames are forwarded properly. Table 4 provides additional information regarding the so-called "forwarding tables," such as dot1qStaticMulticastTable and/or dot1qStaticUnicastTable as defined in for example IEEE 802.1Q and/or RFC 4363.

TABLE 4 dot1qStaticUnicastTable/ieee8021QBridgeStaticUnicastTable: A table containing filtering information configured into the bridge by (local or network) management specifying the set of ports to which frames received from specific ports and containing specific destination addresses are allowed to be forwarded. The value of zero in this table as the port number from which frames with a specific destination address are received, is used to specify all ports for which there is no specific entry in this table for that particular destination address. Entries are valid for unicast and for group/broadcast addresses.

a. dot1qStaticUnicastAddress: The destination MAC address in a frame to which this entry's filtering information applies. This object must take the value of a unicast address.

b. dot1qStaticUnicastReceivePort:. Either the value '0' or the port number of the port from which a frame must be received in order for this entry's filtering information to apply. A value of zero indicates that this entry applies on all ports of the device for which there is no other applicable entry.

c. dot1qStaticUnicastAllowedToGoTo: The set of ports for which a frame with a specific unicast address will be flooded in the event that it has not been learned. It also specifies the set of ports on which a specific unicast address may be dynamically learned. The dot1qTpFdbTable will have an equivalent entry with a dot1qTpFdbPort value of '0' until this address has been learned, at which point it will be updated with the port the address has been seen on. This only applies to ports that are members of the VLAN, defined by dot1qVlanCurrentEgressPorts. The default value of this object is a string of ones of appropriate length.

d. dot1qStaticUnicastStatus: This object indicates the status.

e. See, IEEE 802.1Q and IETF, RFC 4363, "Definitions of Managed Objects for Bridges with Traffic Classes, Multicast Filtering, and Virtual LAN Extensions."

dot1qStaticMulticastTable/ieee8021QBridgeStaticMulticastTable: A table containing filtering information for Multicast and Broadcast MAC addresses for each VLAN, configured into the device by (local or network) management specifying the set of ports to which frames received from specific ports and containing specific Multicast and Broadcast destination addresses are allowed to be forwarded. A value of zero in this table (as the port number from which frames with a specific destination address are received) is used to specify all ports for which there is no specific entry in this table for that particular destination address.

TABLE 4-continued

Entries are valid for Multicast and Broadcast addresses only. Each entry of this table provides information about:

| | |
|---|---|
| f. | dot1qStaticMulticastAddress: The destination MAC address in a frame to which this entry's filtering information applies. This object must take the value of a Multicast or Broadcast address. |
| g. | dot1qStaticMulticastReceivePort: Either the value '0' or the port number of the port from which a frame must be received in order for this entry's filtering information to apply. A value of zero indicates that this entry applies on all ports of the device for which there is no other applicable entry |
| h. | dot1qStaticMulticastStaticEgressPorts: The set of ports to which frames received from a specific port and destined for a specific Multicast or Broadcast MAC address must be forwarded, regardless of any dynamic information, e.g., from GMRP. A port may not be added in this set if it is already a member of the set of ports in dot1qStaticMulticastForbiddenEgressPorts. The default value of this object is a string of ones of appropriate length. The value of this object must be retained across reinitializations of the management system. |
| i. | dot1qStaticMulticastForbiddenEgressPorts: The set of ports to which frames received from a specific port and destined for a specific Multicast or Broadcast MAC address must not be forwarded, regardless of any dynamic information, e.g., from GMRP. A port may not be added in this set if it is already a member of the set of ports in dot1qStaticMulticastStaticEgressPorts. The default value of this object is a string of zeros of appropriate length. The value of this object MUST be retained across reinitializations of the management system |
| j. | dot1qStaticMulticastStatus: This object indicates the status of this entry. |
| k. | See, IEEE 802.1Q and IETF, RFC 4363, "Definitions of Managed Objects for Bridges with Traffic Classes, Multicast Filtering, and Virtual LAN Extensions." |

Using the received managed object(s) such as the forwarding tables and the like, the following actions may be performed. For each egress port $n\alpha$ in the tuple {Multicast MAC address $\alpha$, receive port nR, egress ports [$n\alpha$, 1, . . . $n\alpha$,M], forbidden egress ports, status} in dot1qStaticMulticastTable (or dot1qStaticUnicastTable) with active status, the QoS parameters required for the delays guaranteed by the 3GPP bridge may be derived based on Table 5. The QoS parameters for all egress ports in each tuple {Multicast MAC address $\alpha$, receive port $n_R$, egress ports [$n\alpha$, 1, $n\alpha$,M], forbidden egress ports, status} and for all entries in dot1qStaticMulticastTable (and dot1qStaticUnicastTable) are collected and added to the corresponding sets q(n, n'). Utilizing the QoS parameters listed in the individual sets q(n, n'), the 5G system may properly modify the protocol data unit (PDU) sessions by imposing the corresponding requirements on the individual QoS flows.

QoS parameters within the set, a single QoS parameter may be determined (e.g., derived) with the same delay requirement and the MDBV of the single QoS parameter as the aggregated MDBV over all individual QoS parameters. Supposing that the maximum data burst volume (MDBV) or the delay requirements of the individual QoS parameters differ, then the minimum delay over all QoS parameters and/or maximum data burst volume over all QoS parameters may be used for a single QoS parameter applied. And, if the maximum data burst volume (MDBV) or the delay requirements of the individual QoS parameters differ, the individual QoS flows are set up (where each QoS flow is utilized only for the corresponding subset of entries in the dot1qStaticMulticastTable or dot1qStaticUnicastTable) with the same MDBV and delay requirement. Therefore, if each traffic class reports different delay requirements to the CNC beforehand, then each traffic class is mapped to a different QoS flow. If all delay and maximum data burst volume

TABLE 5

If the receive port $n_R$ is a UE port and the egress port $n_\alpha$ is the UPF port, the QoS constraint for corresponding uplink delay $\delta(n_R, N + 1)$ and MDBV may be derived. The QoS parameters are added to the set $Q$ ($n_R$, N + 1), which collects all QoS parameters for the UE port $n_R$ and uplink.
If the receive port $n_R$ is the UPF port and the egress port $n_\alpha$ is a UE port, then the QoS parameters for corresponding downlink delay $\delta(N + 1, n_\alpha)$ and MDBV is used. The QoS parameters are added to the set $Q$ (N + 1, $n_\alpha$), which collects all QoS parameters for the UE port $n_\alpha$ and downlink.
If the receive port $n_R$ and the egress port are UE ports, then the QoS parameters for corresponding uplink delay $\delta(n_R, N + 1)$ and the QoS parameters for corresponding downlink delay $\delta(N + 1, n_\alpha, N + 1)$ are used. The corresponding parameters are added to $Q$ ($n_R$, N + 1) and $Q$ (N + 1, $n_\alpha$), respectively.

The following provides an illustrative example. Supposing the maximum data burst volume (MDBV) is the same for all QoS parameters in an uplink or downlink of a particular UE's port $n_R$ and the delay requirement is the same for all values within a traffic class for a port are the same, then exactly one QoS flow per traffic class and port is sufficient and the forwarding rule at the UE only needs to consider the traffic class. If for one traffic class and port different MDBV or delays are reported, then the UE port needs to consider the corresponding entry in the forwarding table to determine the QoS flow used for forwarding the frame.

In some example embodiments, the 5G system including the 3GPP bridge 105D determines the QoS constraints required to operate the 3GPP bridge according to a TSN schedule provided by the CNC. For example, only the QoS constraints (which are required for the execution of the schedule determined during the TSN stream requirements and schedule computation phase) are imposed by the 5G system. As part of the configuration of the 3GPP bridge, the 3GPP bridge may receive the forwarding tables, such as objects dot1qStaticMulticastTable and/or dot1qStaticUnicastTable, in order to enable the 3GPP bridge to forward incoming Ethernet frames towards the correct egress ports of the 3GPP bridge.

Figure 2:
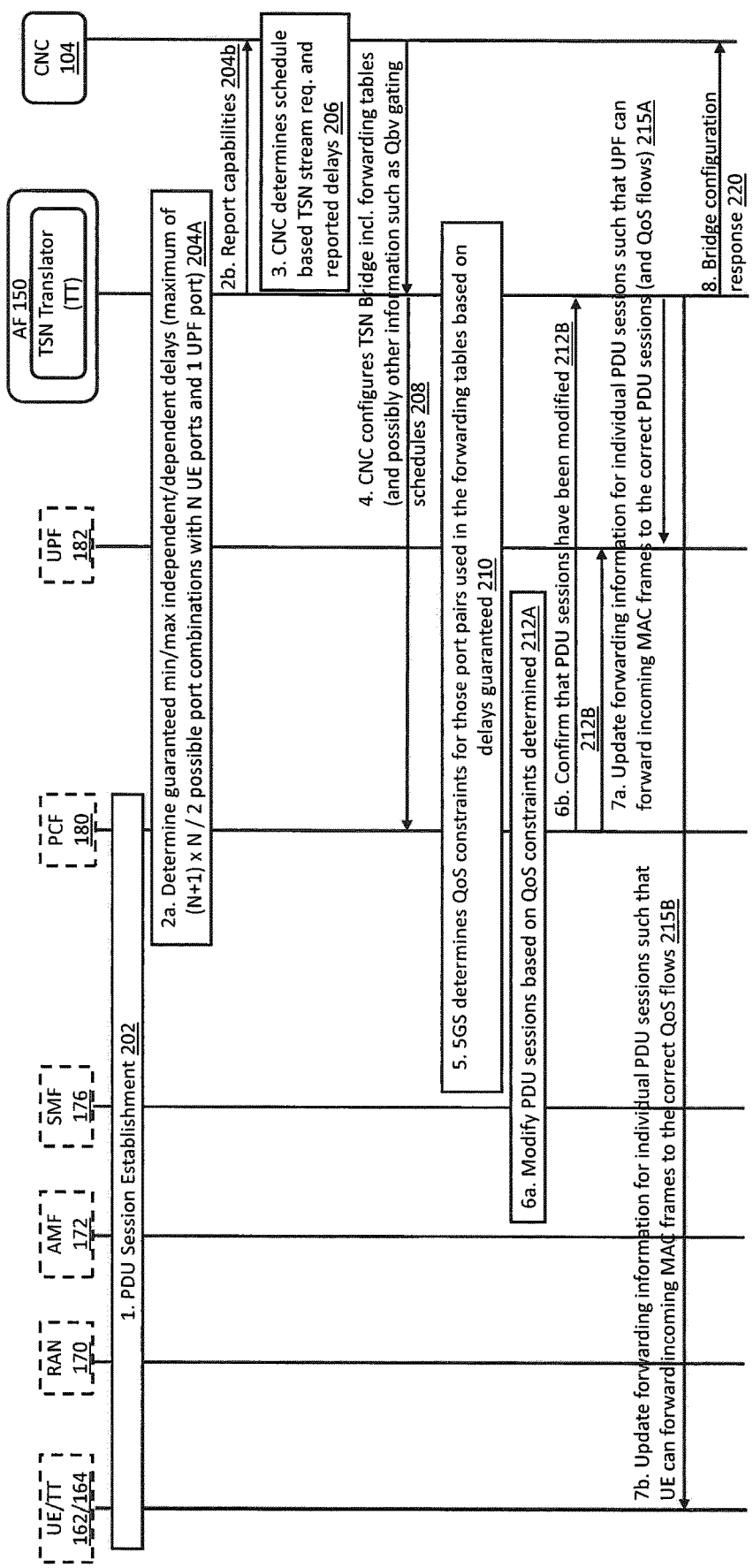
FIG. 2 depicts an example of a sequence diagram for a 3GPP bridge for time sensitive networking, in accordance with some example embodiments.

FIG. 2 depicts an example of a sequence diagram for the 3GPP bridge 105D, in accordance with some example embodiments. The sequence diagram process depicts the signaling among the UE 162 and TT 164 (which in the example of FIG. 1B is coupled to the end station 107A), a radio access network 170 (e.g., a radio access network served by a base station, such as a 5G base station (gNB), eNB, and/or the like), an Access and Mobility Management Function (AMF) 172, a Session Management Function (SMF) 176, a Policy Control Function (PCF) 180, a User Plane Function (UPF) 182, an Application Function (AF) 150 including a TSN translator, and a CNC 104.

Each UE, such as UE 162 (which is a part of the 3GPP bridge) may have a PDU session established as shown at 202. At this stage, there may not be a specific QoS requirement on the established PDU session but the established PDU session may have certain information regarding the PDU session, such as ingress and/or egress ports at the UE and 3GPP bridge 105D. And, any connected devices, such as any end stations associated with TSN system 188A and/or B, may provide their TSN requirements to the CUC 102.

At 204A, the 5G system (as part of the 3GPP bridge) may determine guarantees, such as minimum and/or maximum delay values, for a port or port pair at the 3GPP bridge. At the 3GPP bridge 105D at FIG. 1B for example, for a given port pair 166A-B, such as an ingress port 166A (also referred to as a receive port) and an egress port 166B (also referred to as a transmit port), the 5G system may provide a guarantee for a maximum and/or a minimum delay value through the 3GPP bridge (e.g., δ(n, n') and/or a maximum data burst volume (MDBV) for the corresponding port pair and traffic classes. The bridge's delay values may be determined directly or explicitly (in which case the PCF may determine the delay values in terms of TSN flow schedules or delays provided by the CNC) or indirectly or implicitly (in which case the PCF may determine 3GPP bridge delays so that the AF can derives the TSN flow schedules or bridge delays). The PCF may determine TSN values and/or 3GPP delays and then forward the values to the AF at 204A, so the PCF may convert and/or report these values in corresponding MIBs towards the CNC.

Once these delay values are determined at 204A, the AF 150 may report, at 204B, the determined values to the CNC 104. These values thus represent an initial guarantee of resources in the 5G system for the 3GPP bridge. For example, the values may correspond to bridge delays at a given 3GPP bridge. These delay values may include a minimum frame-length-independent delay, a maximum frame-length-independent delay, a minimum frame-length-dependent delay, and/or a maximum frame-length-dependent delay.

At 206, the CNC 104 may determine the schedule. For example, the CNC may determine the schedules for transmission and/or reception via the 3GPP bridge based on TSN stream requests (which are received from the CUC 102) and reported delays (e.g., the delays reported at 204B between port pairs 166A-B at the 3GPP bridge 105D). The schedules may be in accordance with IEEE 802.1 to ensure the low delay and high reliability of a TSN flow between end stations via the 3GPP bridge.

At 208, the CNC 104 may configure the 3GPP bridge 105D with schedule determined at 206. For example, the CNC may configure the TSN bridge, which in this example is the 3GPP bridge 105D provided via the 5G system. The CNC may configured the 3GPP bridge by forwarding tables, such as the static multicast table (e.g., dot1qStaticMulticastTable) and the static unicast table (e.g., dot1qStaticUnicastTable). The CNC may also configure the 3GPP bridge 105D including the ingress port 166A and egress port 166B with gate schedules defining when to transmit and/or receive in accordance with IEEE 802.1Qbv gating schedules.

For the 3GPP bridge 105D, the 5G system may, at 210, determine the QoS constraints for the port pairs listed in the forwarding tables. For example, the AF 150 and PCF 180 may determine (e.g., derive) the necessary QoS parameters for the 3GPP bridge according to the rules described above with respect to Table 5. The AF may then forward the derived QoS parameters to the PCF. Alternatively or additionally, the AF may forward the forwarding tables (which have the TSN flow requirements for the port pairs) to the PCF, which then derives the QoS parameters for the 3GPP bridge. The forwarding tables enable the 3GPP bridge to determine what receive (or ingress) port-egress port pair combinations are actually being used so that the 3GPP bridge can better allocate resources.

At 212A, the PDU sessions may be modified based on the QoS constraints determined at 210. For example, the PCF may trigger a PDU session modification of the PDU sessions established at 202. For example, the PCF may forward to the SMF 176 the QoS requirements or constraints for 3GPP bridge port pairs as determined at 210. The SMF may then perform the PDU session modification. Depending on the updated QoS parameters, the SMF may set up one or more new QoS flows (which is carried by a given PDU session, for example), release an existing QoS flow, and/or modify the existing QoS flow. Each PDU session may have one or multiple QoS flows which may be characterized by different QoS parameters (e.g., 5QI, packet delay budget values, etc). The 3GPP bridge may expose to the TSN the QoS parameters related to those QoS flows of a PDU session which will carry the TSN flow through the 3GPP bridge. For example, one or more new QoS flow(s) may be set up with the appropriate 5G quality indicator (5QI) dedicated for time sensitive communication with the UPF 182 and/or RAN 170. The SMF may provide the appropriate QoS parameters and Time Sensitive Communication Assistance Information (TSCAI) values to the UPF and RAN. TSCAI describes time sensitive communication traffic characteristics for use in the 5G system. TSCAI may include information such as flow direction, periodicity, and burst arrival time. The knowledge of TSN traffic pattern may be useful for the radio access network (e.g., the gNB serving the RAN that is part of the 3GPP bridge) to allow the 5G system to more efficiently schedule periodic, deterministic traffic flows either via configured grants, semi-persistent scheduling, or with dynamic grants An existing QoS flow may be released with the appropriate 5QI dedicated for time sensitive communication (TSC) with the UPF/RAN, if it is not needed as per the received forwarding table and the delay parameters. For example, if a QoS flow associated with an ingress port and egress port pair is not scheduled in the forwarding table, this may indicate a lack of actual traffic over this port pair so the QoS flow may be released. Moreover, if an established QoS flow for a PDU session has much more stringent packet delay budget (which represents maximum delay that packet may have while being transmitted from UE to UPF), the existing QoS flow may be modified with the appropriate 5QI dedicated for TSC with UPF/RAN. Accordingly, the SMF may provide QoS parameters/rules to the RAN for the TSC QoS flow and provides QoS parameters/rules to the UPF for the given QoS flow within the PDU session. The AF may wait to receive the confirmation that the PDU sessions have been modified accordingly. The SMF may derive the parameters/rules to instruct the UE/UPF how to treat the packets for specific PDU session/QoS flow (see, e.g., 3GPP TS 23.501).

As noted, if there are no forwarding table entries for a UE port (as an ingress port or as an egress port), the corresponding ingress or egress QoS flows can be released if they have been used before as the lack of an entry may indicate no actual TSN traffic is present. If a gate (e.g., at an ingress port or egress port) is not scheduled in accordance with an IEEE 802.1Qbv gating schedule, then the QoS flows corresponding to this traffic class may be released (e.g., when an egress port at a UE, the downlink for the UE may be released, and when the egress port is at the UPF, then it is an uplink for all UEs may be released). With gate scheduling, each gate may be associated with a traffic class, such as 0 for best efforts and 1-8 for high-priority traffic. If traffic classes 1-8 are never used (which indicates their corresponding gates are never opened), there is no need for a high-quality connection to this particular port in the egress direction (e.g., downlink for the UE and uplink for the UPF). If there has been a QoS flow before (because 5G bridge received updated information from CNC or QoS flows were set up a-priori), then the QoS flow can be released. If a prior report to a centralized network controller included a different packet delay budget, the corresponding QoS flow may be modified. This may occur when the reported maximum delay towards the CNC is changed towards a higher value. In such a case, the corresponding packet delay budget (PDB) for a QoS flow can be modified as well. The PDB may define an upper bound for the time that a packet may be delayed between the UE and the UPF that terminates the N6 interface. For a certain 5QI, the value of the PDB may be the same in the uplink and downlink. In the case of 3GPP access, the PDB may be used to support the configuration of scheduling and link layer functions (e.g. the setting of scheduling priority weights and HARQ target operating points).

At 212B, the PCF 180 may, as noted, confirm the PDU sessions have been modified. For example, the PCF may send a confirmation message or messages to the UPF 182 and/or AF 150 as shown at 212B to confirm the modification (e.g., a release of a flow, a modification of a flow's parameters, an addition of a flow, etc.).

At 215A, the AF 150 may update forwarding table information for an individual PDU session, such that the UPF 182 can forward incoming MAC frames to the correct PDU sessions and QoS flows. If one traffic class is assigned to exactly one QoS flow, the AF may only have to provide this unique association in addition to the forwarding table. If, as a result of the above-described QoS parameters derivation, multiple QoS flows for one traffic class are utilized, then the AF may need to provide the corresponding mapping of entries in the forwarding table to QoS flows. The AF may also provide the 3GPP bridge configuration response to the CNC. For example, an acknowledgment message may be signaled to indicate that the bridge is configured without errors/problems and that it can be used for actual stream transmission.

At 215B, the AF 150 may update forwarding information for individual PDU session such that the end station can forward incoming MAC frames to the correct QoS flows. If for example, one traffic class is assigned to exactly one QoS flow, the AF may only have to provide this unique association in addition to the forwarding table. If, as a result of the above-described QoS parameters derivation, multiple QoS flows for one traffic class are utilized, then the AF may need to provide the corresponding mapping of entries in the forwarding table to QoS flows.

At 220, the AF 150 may send a configuration response to the CNC 104. For example, an acknowledgment message indicating that the 3GPP bridge is configured without errors/problems and is ready for actual stream transmission.

As a special case of the above, if a particular UE port is not listed for any MAC address as an ingress or egress port, then it may be sufficient if only a PDU session with QoS flow with 5QI=9 that corresponds to best-effort (e.g., 5QI is chosen equivalent to TSN traffic class 0) is maintained. This means that this port may not be used for time sensitive traffic. Nevertheless, some other traffic may be still sent over this port, such as LLDP messages for topology discovery. In order to transmit such traffic it is necessary to maintain at least best-effort PDU session.

Figure 3:
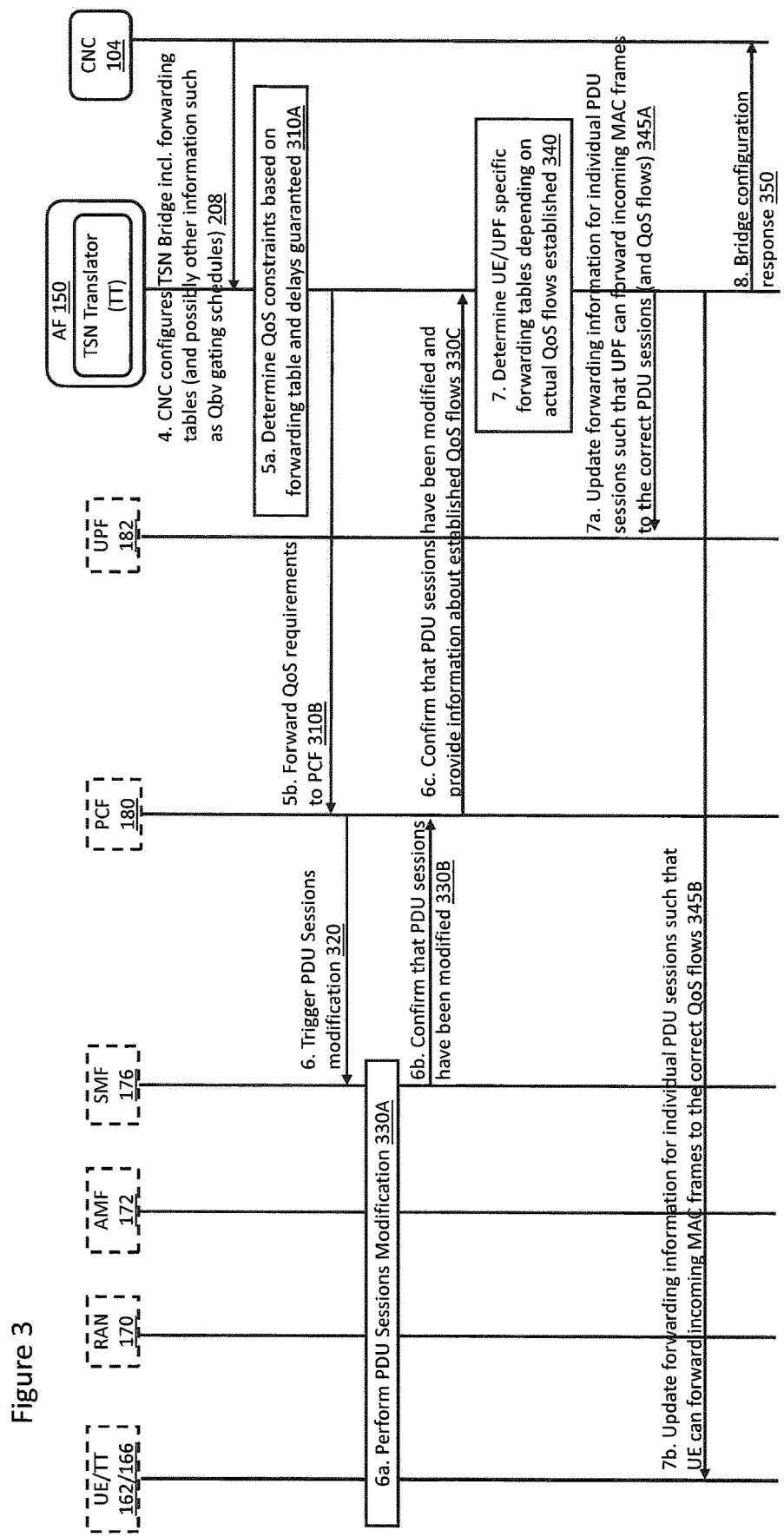
FIG. 3 depicts another example of a sequence diagram for a 3GPP bridge for time sensitive networking, in accordance with some example embodiments.

FIG. 3 depicts a sequence diagram for an example in which the AF 150 determines the 5GS QoS parameters based on the CNC provided information and distributes the forwarding tables for the UPF and the end station, such as UE 107A. As with the FIG. 2 example, 202-208 may be performed as well.

At 310A, the AF 150 may determine, for a given 3GPP bridge 105D, the QoS constraints or requirements over the 3GPP bridge for the port pairs listed in the forwarding tables. The QoS constraints may be determined based on the original delay guarantees made at 204A and the forwarding tables, such as dot1qStaticMulticastTable and/or dot1qStaticUnicastTable as defined in for example IEEE 802.1Q and/or RFC 4363.

At 310B, the AF 150 may forward the determined QoS requirements to the PCF 180, which may trigger the PDU session modification message to be sent, at 320, to the SMF 176. At 330A, PDU session modification may be performed in a manner similar to what was described with respect to 212A. At 330B, the SMF 176 may confirm that the PDU sessions have been modified by sending a message to the PCF 180, which triggers a confirmation message, at 330C, to the AF 150. The message at 330C may also include information about the established QoS flows being carried via the established PDU sessions.

At 340, the AF may determine UE and/or UPF specific forwarding tables based on the actual QoS flows established (as signaled by 330C). If for example one traffic class is assigned to exactly one QoS flow, the AF may only have to provide this unique association in addition to the forwarding table. If, as a result of the above-described QoS parameters derivation, multiple QoS flows for one traffic class are utilized, then the AF may need to provide the corresponding mapping of entries in the forwarding table to QoS flows.

At 345A, the AF 150 may update forwarding information for individual PDU sessions, such that the UPF 182 can forward incoming MAC frames to the correct PDU sessions and QoS flows in a manner similar to what was described above at 215A. At 345B, the AF 150 may update forwarding information for individual PDU session such that the end station can forward incoming MAC frames to the correct QoS flows as described above at 215B. And, at 350, the AF 150 may send a configuration response to the CNC 104 as described above at 220.

Figure 4:
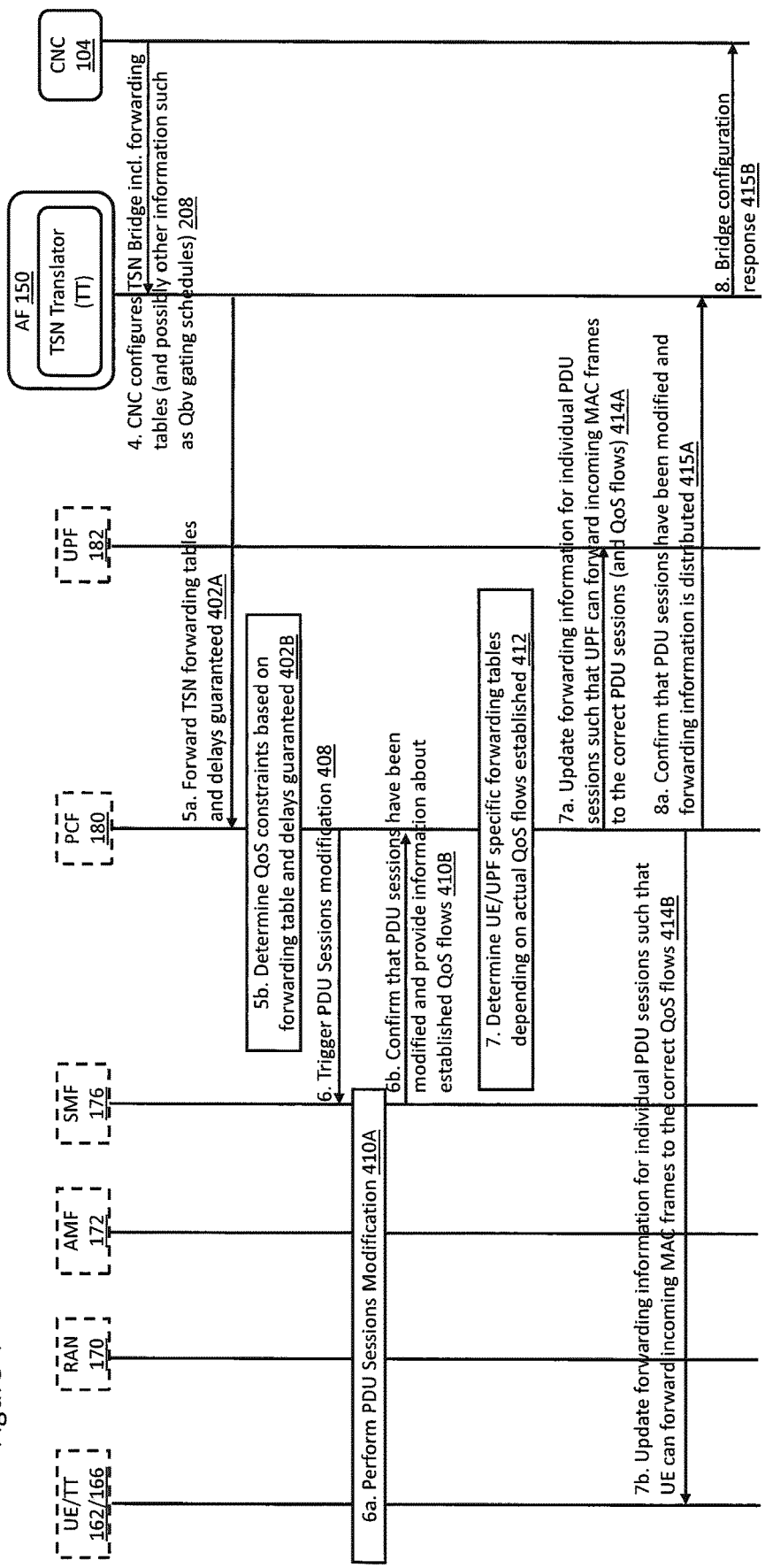
FIG. 4 depicts yet another example of a sequence diagram for a 3GPP bridge for time sensitive networking, in accordance with some example embodiments.

FIG. 4 shows the sequence diagram for the case when the PCF 180 determines the 5GS QoS parameters based on the CNC provided information and distributes the forwarding tables to the SMF. The SMF updates the PDU session for a given UE and updates the QoS parameters in the RAN and UPF to ensure that the QoS characteristics are setup for the given UE. As with the FIG. 2 example, 202-208 may be performed as well.

At 402A, the AF 150 may forward, to the PCF, 180, the forwarding tables, such as dot1qStaticMulticastTable and/or dot1qStaticUnicastTable as defined in for example IEEE 802.1Q and/or RFC 4363, and the original delay guarantees made at 204A for the 3GPP bridge.

At 402B, the PCF 180 may determine, for a given 3GPP bridge 105D, the QoS constraints or requirements over the 3GPP bridge for the port pairs listed in the forwarding tables. The QoS constraints may be determined based on the original delay guarantees made at 204A for example (which were received by the PCF at 402A) and the forwarding tables, such as dot1qStaticMulticastTable and/or dot1qStaticUnicastTable as defined in for example IEEE 802.1Q and/or RFC 4363.

At 408, the PCF 180 may send a message to the SMF to trigger PDU session modification. At 410A, the PDU session modification may be performed in a manner similar to what was described with respect to 212A. At 410B, the SMF 176 may confirm that the PDU sessions have been modified by sending a message to the PCF 180.

At 412, the PCF 180 may determine UE and/or UPF specific forwarding tables based on the actual QoS flows established (as signaled by 410B). At 415A, the PCF may update forwarding information for individual PDU sessions, such that the UPF 182 can forward incoming MAC frames to the correct PDU sessions and QoS flows in a manner similar to what was described above at 215A. At 414B, the PCF may update forwarding information for individual PDU session such that the end station can forward incoming MAC frames to the correct QoS flows as described above at 215B. And, at 415A, the PCF may confirm that he PDU sessions have been modified and forwarding information modified by sending a message to the AF 150, which triggers the bridge response configuration complete message at 415B.

Similarly, in networks not utilizing IEEE 802.1Q, also the object dot1dStaticTable (BRIDGE-MIB) to pre-configure a MAC bridge can be utilized. This usually is the case by using a network management tool where the operation of industrial processes is pre-planned. Depending on the standards that the bridge is supporting, different MIBs may contain the information on forwarding tables, and may be configured by different management entities. In this example, a network management tool may provide such tables during the network pre-planning phase.

Figure 5:
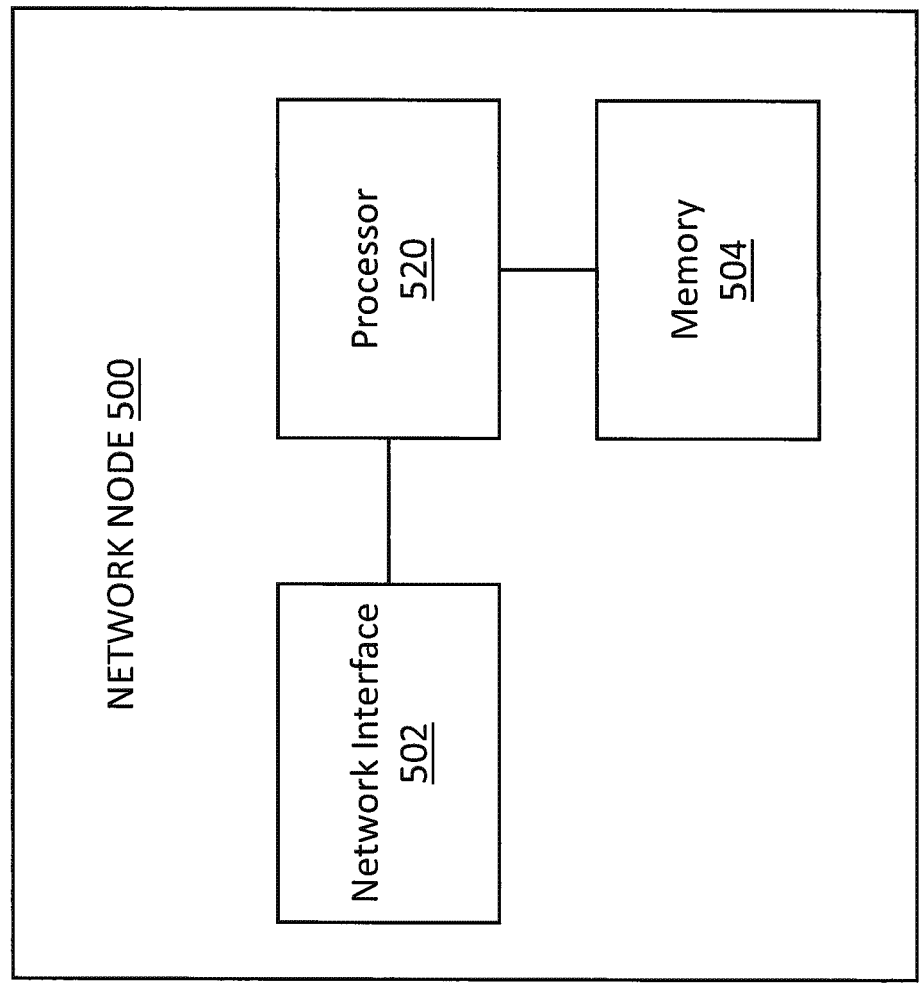
FIG. 5 depicts an example of a network node, in accordance with some example embodiments.

FIG. 5 depicts a block diagram of a network node 500, in accordance with some example embodiments. The network node 500 may be configured to provide one or more network side functions, such as a base station (e.g., RAN 170), AMF 172, PCF 180, AF 150, CNC 104, CUC 102, and/or other network nodes.

The network node 500 may include a network interface 502, a processor 520, and a memory 504, in accordance with some example embodiments. The network interface 502 may include wired and/or wireless transceivers to enable access other nodes including base stations, devices 152-180, the Internet, and/or other nodes. The memory 504 may comprise volatile and/or non-volatile memory including program code, which when executed by at least one processor 520 provides, among other things, the processes disclosed herein with respect to the network node (see, e.g., processes at FIGS. 2-4, and/or the like). For example, the network node may be configured to at least receive at least one management object, the at least one management object comprising routing information between an ingress port at a 3GPP bridge and an egress port at the 3GPP bridge; determine, for the ingress port and the egress port combination, at least one quality of service constraint to provide a delay guarantee towards the destination media access control address, the determination based on the received at least one management object and one or more bridge delays indicating a delay between the ingress port and the egress port; and cause a change, based on the determined at least one quality of service constraint, to a protocol data unit session carrying a time sensitive network flow.

Figure 6:
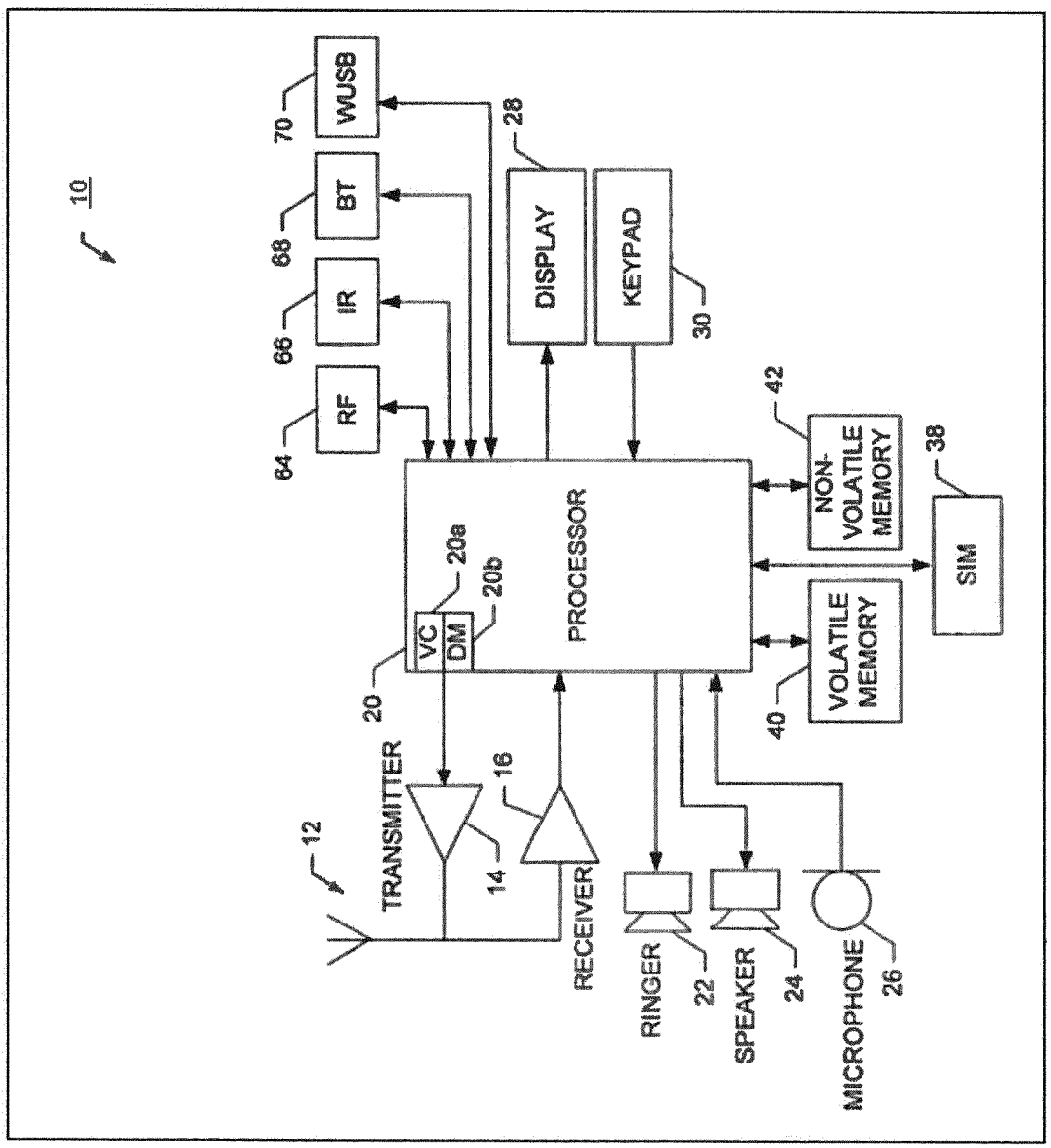
FIG. 6 depicts an example of an apparatus, in accordance with some example embodiments.

FIG. 6 illustrates a block diagram of an apparatus 10, in accordance with some example embodiments.

The apparatus 10 may represent a user equipment, such as the user equipment 166 which may include a TT and be coupled to an end station. The apparatus 10, or portions therein, may be implemented in other network nodes including base stations/WLAN access points as well as the other network nodes.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN)

techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced operations of TSN networks.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor; and
   at least one memory including computer program code for an application function of a 3GPP bridge for a time sensitive network, wherein the computer program code when executed by the at least one processor, cause the apparatus to at least:
   receive, from a centralized network controller for the time sensitive network, at least one management object, the at least one management object comprising routing information for routing traffic of a time sensitive network flow between an ingress port of the 3GPP bridge and an egress port of the 3GPP bridge;
   determine, based on the routing information and a bridge delay indicating a delay between the ingress port and the egress port through the 3GPP bridge, at least one quality of service constraint for the time sensitive network flow to provide a delay guarantee for forwarding traffic of the time sensitive network flow towards a destination media access control address; and
   forwarding, to a policy control function of the 3GPP bridge, the at least one quality of service constraint to cause a change to a quality of service constraint of a protocol data unit session carrying the time sensitive network flow.

2. The apparatus of claim 1, wherein the delay guarantee represents a constraint on a quality of service for the time sensitive network flow.

3. The apparatus of claim 1, wherein the at least one management object comprises a forwarding table indicating actual traffic for the ingress port and the egress port.

4. The apparatus of claim 1, wherein the at least one management object comprising comprises at least one of a static multicast table, a static unicast table, queue information, schedule information in accordance with IEEE 802.1Qbv, or a combination thereof wherein the at least one management object is provided in a distributed manner via a stream reservation protocol of the time sensitive network.

5. The apparatus of claim 1, wherein the routing information further defines whether traffic transmission related to a certain traffic class on the ingress port or the egress port is allowed.

6. The apparatus of claim 1, wherein the at least one management object comprises at least one of queue information in accordance with IEEE 802.1Qbv or schedule information in accordance with IEEE 802.1Qbv.

7. The apparatus of claim 1, wherein the apparatus is further configured to at least release the protocol data unit session when the protocol data unit session is associated with a certain traffic class and traffic transmission related to the certain traffic class on the ingress port or the egress port is not allowed.

8. A method comprising:
receiving, from a centralized network controller for a time sensitive network, at least one management object, the at least one management object comprising routing information for routing traffic of a time sensitive network flow between an ingress port of a 3GPP bridge and an egress port of the 3GPP bridge;
determining, based on the routing information and a bridge delay indicating a delay between the ingress port and the egress port through the 3GPP bridge, at least one quality of service constraint for the time sensitive network flow to provide a delay guarantee for forwarding traffic of the time sensitive network flow towards a destination media access control address; and
forwarding, to a policy control function of the 3GPP bridge, the at least one quality of service constraint to cause a change to a quality of service constraint of a protocol data unit session carrying a time sensitive network flow.

9. The method of claim 8, wherein the delay guarantee represents a constraint on a quality of service for the time sensitive network flow.

10. The method of claim 8, wherein the at least one management object comprises a forwarding table indicating actual traffic for the ingress port and the egress port.

11. The method of claim 8, wherein the at least one management object comprises at least one of a static multicast table, a static unicast table, queue information, schedule information in accordance with IEEE 802.1Qbv, or a combination thereof, wherein the at least one management object is provided in a distributed manner via a stream reservation protocol of the time sensitive network.

12. A non-transitory computer-readable storage medium including program code, which when executed by at least one processor causes operations comprising:
receiving, from a centralized network controller for a time sensitive network, at least one management object, the at least one management object comprising routing information for routing traffic of a time sensitive network flow between an ingress port of a 3GPP bridge and an egress port of the 3GPP bridge;
determining, based on the routing information and a bridge delay indicating a delay between the ingress port and the egress port through the 3GPP bridge, at least one quality of service constraint for the time sensitive network flow to provide a delay guarantee for forwarding traffic of the time sensitive network flow towards a destination media access control address; and
forwarding, to a policy control function of the 3GPP bridge, the at least one quality of service constraint to cause a change to a quality of service constraint of a protocol data unit session carrying a time sensitive network flow.

13. An apparatus comprising:
at least one processor; and
at least one memory including computer program code for an policy control function of a 3GPP bridge for a time sensitive network, wherein the computer program code when executed by the at least one processor, cause the apparatus to at least:
receive, from an application function of a 3GPP bridge to a policy control function of the 3GPP bridge, at least one quality of service constraint to cause a change to a quality of service constraint for a time sensitive network flow to provide a delay guarantee for forwarding traffic of the time sensitive network flow towards a destination media access control address of a protocol data unit session carrying the time sensitive network flow; and
trigger a protocol data unit session modification to cause the change to the quality of service constraint of the protocol data unit session carrying the time sensitive network flow to provide the delay guarantee for forwarding traffic of the time sensitive network flow towards the destination media access control address of the protocol data unit session carrying the time sensitive network flow.

14. The apparatus of claim 13, wherein the delay guarantee represents a constraint on a quality of service for the time sensitive network flow.

\* \* \* \* \*